US007409482B2

(12) United States Patent
Olsen et al.

(10) Patent No.: US 7,409,482 B2
(45) Date of Patent: Aug. 5, 2008

(54) COMPUTER AND METHOD FOR ON-DEMAND NETWORK ACCESS CONTROL

(75) Inventors: Claus Michael Olsen, Cortlandt Manor, NY (US); Chandrasekhar Narayanaswami, Wilton, CT (US); Thomas Richard Hildner, Cary, NC (US)

(73) Assignee: Lenovo (Singapore) Pte, Ltd., Singapore (SG)

( * ) Notice: Subject to any disclaimer, the term of this patent is extended or adjusted under 35 U.S.C. 154(b) by 276 days.

(21) Appl. No.: 10/973,315

(22) Filed: Oct. 26, 2004

(65) Prior Publication Data

US 2006/0090023 A1    Apr. 27, 2006

(51) Int. Cl.
*G06F 13/00* (2006.01)
(52) U.S. Cl. ...................... 710/107; 709/225
(58) Field of Classification Search ................ 710/107, 710/108, 200, 305; 709/203, 218, 223–225; 370/254, 259, 401, 431; 340/825; 707/10; 718/100, 107; 379/221.01; 713/324
See application file for complete search history.

(56) References Cited

U.S. PATENT DOCUMENTS

| | | | | |
|---|---|---|---|---|
| 5,560,024 A * | 9/1996 | Harper et al. | ............... | 713/322 |
| 5,815,732 A * | 9/1998 | Cooper et al. | ............... | 710/36 |
| 5,887,140 A * | 3/1999 | Itsumi et al. | ............... | 709/225 |
| 5,970,228 A * | 10/1999 | Nezu | ............... | 726/34 |
| 6,230,156 B1 * | 5/2001 | Hussey | ............... | 707/10 |
| 6,606,163 B1 * | 8/2003 | Suzuki et al. | ............... | 358/1.15 |
| 6,678,065 B1 * | 1/2004 | Hikawa | ............... | 358/1.13 |
| 6,735,707 B1 | 5/2004 | Kapil | ............... | 713/322 |
| 6,985,886 B1 * | 1/2006 | Broadbent et al. | ............... | 705/38 |
| 6,996,778 B2 * | 2/2006 | Rajarajan et al. | ............... | 715/734 |
| 2003/0023774 A1 * | 1/2003 | Gladstone et al. | ............... | 709/328 |
| 2003/0140251 A1 | 7/2003 | Marin et al. | ............... | 713/201 |
| 2004/0042049 A1 * | 3/2004 | Hulan et al. | ............... | 358/404 |
| 2005/0229018 A1 * | 10/2005 | De Oliveira Kastrup Pereira et al. | ............... | 713/324 |

FOREIGN PATENT DOCUMENTS

WO    WO 02/103498    12/2002

OTHER PUBLICATIONS

"Development of a network distributed telecare robotic system using CORBA" by Jia et al. (abstract only) Publication Date: Oct. 8-13, 2003.*

(Continued)

*Primary Examiner*—Clifford H Knoll
(74) *Attorney, Agent, or Firm*—Ohlandt, Greeley, Ruggiero & Perle, L.L.P.

(57) ABSTRACT

A computer and method that control access to a network. The computer includes an application that shrinks the window of opportunity for a network attack and reduces power consumption by automatically causing a computer to connect to the network when access is needed and to disconnect the computer from the network when access is not needed. The computer is automatically disconnected when it is deemed that network access is no longer needed, such as after a time period of no network activity. In turn, when the user, or the system, needs access to the network, the computer is automatically reconnected to the network. A software daemon on the computer may temporarily reconnect the computer to the network to access a server on the network to determine if attempts have been made to access the computer.

39 Claims, 4 Drawing Sheets

OTHER PUBLICATIONS

[GIAC] B. Corll, "Welchia Worm vs. Policy Makers Fighting Malware with Policy, not with Fire," Practical report by GIAC Analyst#0543, Feb. 2004, http://ww.giac.org/gcih.php.

[CodeRedII] R. Russell, A. Mackie, "Code Red II Worm," Security Focus, Inc., Incident Analysis Report, Aug. 2001.
International Search Report dated Aug. 22, 2005.

* cited by examiner

COMPUTER AND METHOD FOR ON-DEMAND NETWORK ACCESS CONTROL

FIELD OF THE INVENTION

This invention relates to a computer and a method of controlling network access to or from the computer.

BACKGROUND OF THE INVENTION

Most computers, such as desktop computers and mobile devices, need to periodically access a network, such as a wide area network (WAN), e.g., the Internet, a local area network (LAN) or other network. Typically, these computers are constantly connected to the network while they are being used. This is particularly true for desktop systems that are hardwired to the network. Mobile devices need to be in the proximity of a wireless access point in order to gain network access. Such wireless access points are becoming increasingly pervasive due to so-called wireless "hot spots" that are springing up in many places, e.g., airports, train stations, cafés, office buildings, homes, etc. Other devices that may connect to wireless access points include sensors, actuators and vending machines.

Computers that are almost constantly network connected have two drawbacks. First, energy is wasted in the network interface card (NIC) whenever the user is not using it. This is a particular concern in mobile devices, such as cellphones and PDAs, and wirelessly connected devices in general, such as sensors. In these devices, the wireless NIC accounts for a significant fraction of the total power budget and therefore may significantly reduce the battery life. Second, a computer that is connected to a network can potentially be attacked from another computer connected to the network. The most likely attack is from network worms, which spread rapidly from one computer to another computer and which are persistent in their attempt to spread. Typically, these worms send short packets (about 1 kBytes) to random network addresses. If a destination computer is connected to the network and its network address matches the address of the worm packet, then the destination computer is likely to become infected if it allows the worm packet to access its network port. The longer a user computer is on the network, the more susceptible it is to such attacks. Also, users often leave their office and home computers running and permanently network connected while they are at home and at work, respectively. Examples of recent network worms include Welchia, Blaster, Slammer and CodeRedll. The Welchia or Blaster worms get into a computer's system, through an RPC call to port 135, where it exploits a bug in a distributed component object model (DCOM). Slammer uses unreliable delivery protocol (UDP) and exploits a weakness in the simple query language (SQL) server. CodeRedll takes advantage of a buffer overflow bug in an Indexing Server.

To get an idea of how much time a client computer station is effectively using the network interface card (NIC) during an 8 hour work day, assume a user accesses 200 webpages and that a typical webpage contains about 250 kBytes ("k" designating 1000, not 1024) of information. Assume further the user replicates 50 email messages, each having a 500 kBytes attachment. The amount of transmitted data is typically much smaller and will be ignored here. Finally, assume the computer is equipped with a wireless NIC, such as a NIC conforming to the 802.11b IEEE standard, which has a maximum effective throughput of about 500 kBytes/s under low contention conditions. Typical download speeds, however, from the Internet and from email servers are commonly much slower, for example, about 50 kBytes/s. Thus, the total time the NIC is engaged with receiving and waiting for data may be calculated as (200[pages]×250[kBytes/page]+50[emails]×500 [kBytes/email])/50[kBytes/s]=1,500 seconds or about 5% of an 8 hour work day. A wireless NIC conforming to 802.11g may have a throughput that is 5 times faster than 802.11b NIC. Correspondingly even less than 5% time is spent accessing the network. It may, therefore, be concluded that the amount of time a computer actually spends effectively using the network is quite small compared to the total time the computer is in use. When this is coupled with the observation that network accesses are highly bursty in nature, it is clear that there exist long periods of time during which a computer's NIC can be turned off, thus offering both protection from network attacks and reduced energy consumption.

Thus, there is a need for throttling a computer's access to the network 1) to reduce the window of opportunity for being attacked by another network connected computer, 2) to reduce the rate with which a virus spreads across networks, and 3) to increase the battery life in mobile devices. A present day solution to this problem is that the user manually disables the network interface when it is not needed. This solution, however, suffers from requiring the user's involvement, and is cumbersome.

SUMMARY OF THE INVENTION

The present invention shrinks the window of opportunity for a network attack and reduces power consumption by automatically disabling the network interface when it is not needed. Our invention also automatically enables the network interface when the user/system needs access to the network. More specifically, a Network Interface Card (NIC) is automatically disabled when it is deemed no longer needed, such as after a time period of no network activity. In turn, when the user, or the system, needs access to the network, the NIC is automatically re-enabled. In this fashion, the NIC is power managed in much the same way that the display and the hard-drive are managed. Furthermore, the user or IT organization can select a policy that will determine which applications, or processes, are permitted to enable/disable the NIC, what their associated timeout values are, and under what conditions these applications, or processes, may or may not access the network. Networking can be completely shut off if no networking applications are open. The NIC can be either a wired or a wireless interface. There can also be more than one NIC and there can be a mix of wired and wireless NICs.

In a method embodiment of the present invention, access between a computer and a network is controlled. Network requests associated with at least one task running on the computer are detected. In response to a detected network request, the task is enabled to access the network if network access for the task is currently disabled. In response to a lack of recent activity associated with the task on the network, at least one device on the network is prevented from accessing at least one port which is currently open on the computer.

In another embodiment of the method of the present invention, the step of preventing prevents access to all ports of the computer.

In another embodiment of the method of the present invention, the step of preventing access to all ports comprises at least one step selected from the group consisting of: closing all ports on the computer, making a network address of the computer invisible from the network, stopping a DHCP service running on the computer, and disabling at least one NIC associated with the computer.

In another embodiment of the method of the present invention, the step of enabling the task to access the network comprises at least one step selected from the group consisting of: enabling a port on the computer, making a network address of the computer invisible from the network, starting a DHCP service, and enabling a NIC associated with the computer.

In another embodiment of the method of the present invention, a further step determines if the task may access the network and if yes performing the enabling step.

In another embodiment of the method of the present invention, a further step determines if a timeout period has elapsed during which the network has been free of activity associated with the task, and if the timeout period has elapsed, performing the step of preventing.

In another embodiment of the method of the present invention, the network requests are inbound or outbound from the other devices or the task, respectively.

In another embodiment of the method of the present invention, the task is one of a plurality of tasks that run on the computer. A further step filters the requests based on a connectivity policy that allows only requests from selected ones of the tasks to be an input to the enabling step.

In another embodiment of the method of the present invention, the selected tasks are established by one of the group consisting of: a user; automatically; and a combination thereof.

In another embodiment of the method of the present invention, the preventing step is also performed in response to none of the selected tasks currently running on the computer.

In another embodiment of the method of the present invention, further steps comprise enabling access to the network for brief instants without regard to the network requests and querying at least one server connected to the network to determine if attempts have been made to access the computer.

In another embodiment of the method of the present invention, the enabling access to the network for brief instants and querying steps are initiated periodically and/or in response to a request from one of the tasks.

In another embodiment of the method of the present invention, the enabling and preventing steps throttle access of the computer to the network so as to shrink windows of opportunity for the computer to be attacked by other devices connected to the network.

In another embodiment of the method of the present invention, the access between the computer and the network is throttled during a session of the computer with a network server in a DMZ zone so that such access is enabled for a service offered by the network server during the session and is disabled by the preventing step.

In a computer embodiment of the present invention, the computer is operable to control access between the computer and a network. The computer comprises a processor, at least one task that run on the computer and an application that runs on the computer. The application causes the processor to perform the operations of:

detecting network requests associated with the task running on the computer;
  in response to a detected network request, enabling the task to access the network if network access for the task is currently disabled; and
  in response to a lack of recent activity associated with the task on the network, preventing at least one device on the network from accessing at least one port which is currently open on the computer.

In another computer embodiment of the present invention, the operation of preventing prevents access to all ports of the computer.

In another computer embodiment of the present invention, the operation of preventing access to all ports comprises at least one operation selected from the group consisting of: closing all ports on the computer, making a network address of the computer invisible from the network, stopping a DHCP service running on the computer, and disabling at least one NIC associated with the computer.

In another computer embodiment of the present invention, the operation of enabling the task to access the network comprises at least one operation selected from the group consisting of: enabling a port on the computer, making a network address of the computer invisible from the network, starting a DHCP service, and enabling a NIC associated with the computer.

In another computer embodiment of the present invention, the application further causes the processor to perform the operation of determining if the task may access the network and if yes performing the enabling operation.

In another computer embodiment of the present invention, the application further causes the processor to perform the operation of determining if a timeout period has elapsed during which the network has been free of activity associated with the task, and if the timeout period has elapsed, performing the operation of preventing.

In another computer embodiment of the present invention, the network requests are inbound or outbound from the other devices or the task, respectively.

In another computer embodiment of the present invention, the task is one of a plurality of tasks that run on the computer, and wherein the application further causes the processor to perform the operation of filtering the requests based on a connectivity policy that allows only outbound requests from selected ones of the tasks to be an input to the enabling operation.

In another computer embodiment of the present invention, the selected tasks are established by one of the group consisting of: a user; automatically; and a combination thereof.

In another computer embodiment of the present invention, the preventing operation is also performed in response to none of the selected tasks currently running on the computer.

In another computer embodiment of the present invention, the application further causes the processor to perform the operations of enabling access to the network for brief instants without regard to the network requests and querying at least one server connected to the network to determine if attempts have been made to access the computer.

In another computer embodiment of the present invention, the enabling access to the network for brief instants and querying operations are initiated periodically and/or in response to a request from one of the tasks.

In another computer embodiment of the present invention, the enabling and preventing operations throttle access of the computer to the network so as to shrink windows of opportunity for the computer to be attacked by other devices connected to the network.

In another computer embodiment of the present invention, the access between the computer and the network is throttled during a session of the computer with a network server in a DMZ zone so that such access is enabled for a service offered by the network server during the session and is disabled by the preventing step.

In a memory media of the present invention, the memory media controls a computer to control access between the computer and a network. The computer comprises a processor. The memory media stores a program that comprises instructions that control the computer to perform the operations of:

detecting network requests associated with at least one task running on the computer;

in response to a detected network request, enabling the task to access the network if network access for the task is currently disabled; and in response to a lack of recent activity associated with the task on the network, preventing at least one device on the network from accessing at least one port which is currently open on the computer.

In another memory media embodiment of the present invention, the operation of preventing prevents access to all ports of the computer.

In another memory media embodiment of the present invention, the operation of preventing access to all ports comprises at least one operation selected from the group consisting of: closing all ports on the computer, making a network address of the computer invisible from the network, stopping a DHCP service running on the computer, and disabling at least one NIC associated with the computer.

In another memory media embodiment of the present invention, the operation of enabling the task to access the network comprises at least one operation selected from the group consisting of: enabling a port on the computer, making a network address of the computer invisible from the network, starting a DHCP service, and enabling a NIC associated with the computer.

In another memory media embodiment of the present invention, the application further causes the processor to perform the operation of determining if the task may access the network and if yes performing the enabling operation.

In another memory media embodiment of the present invention, the application further causes the processor to perform the operation of determining if a timeout period has elapsed during which the network has been free of activity associated with the task. If the timeout period has elapsed, the operation of preventing is performed.

In another memory media embodiment of the present invention, the network requests are inbound or outbound from the other devices or the task, respectively.

In another memory media embodiment of the present invention, the task is one of a plurality of tasks that run on the computer, and wherein the application further causes the processor to perform the operation of filtering the requests based on a connectivity policy that allows only requests from selected ones of the tasks to be an input to the enabling operation.

In another memory media embodiment of the present invention, the selected tasks are established by one of the group consisting of: a user; automatically; and a combination thereof.

In another memory media embodiment of the present invention, the preventing operation is also performed in response to none of the selected tasks currently running on the computer.

In another memory media embodiment of the present invention, the application further causes the processor to perform the operations of enabling access to the network for brief instants without regard to the network requests and querying at least one server connected to the network to determine if attempts have been made to access the computer.

In another memory media embodiment of the present invention, the enabling access to the network for brief instants and querying operations are initiated periodically and/or in response to a request from one of the tasks.

In another memory media embodiment of the present invention, the enabling and preventing operations throttle access of the computer to the network so as to shrink windows of opportunity for the computer to be attacked by other devices connected to the network.

In another memory media embodiment of the present invention, the access between the computer and the network is throttled during a session of the computer with a network server in a DMZ zone so that such access is enabled for a service offered by the network server during the session and is disabled by the preventing step.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
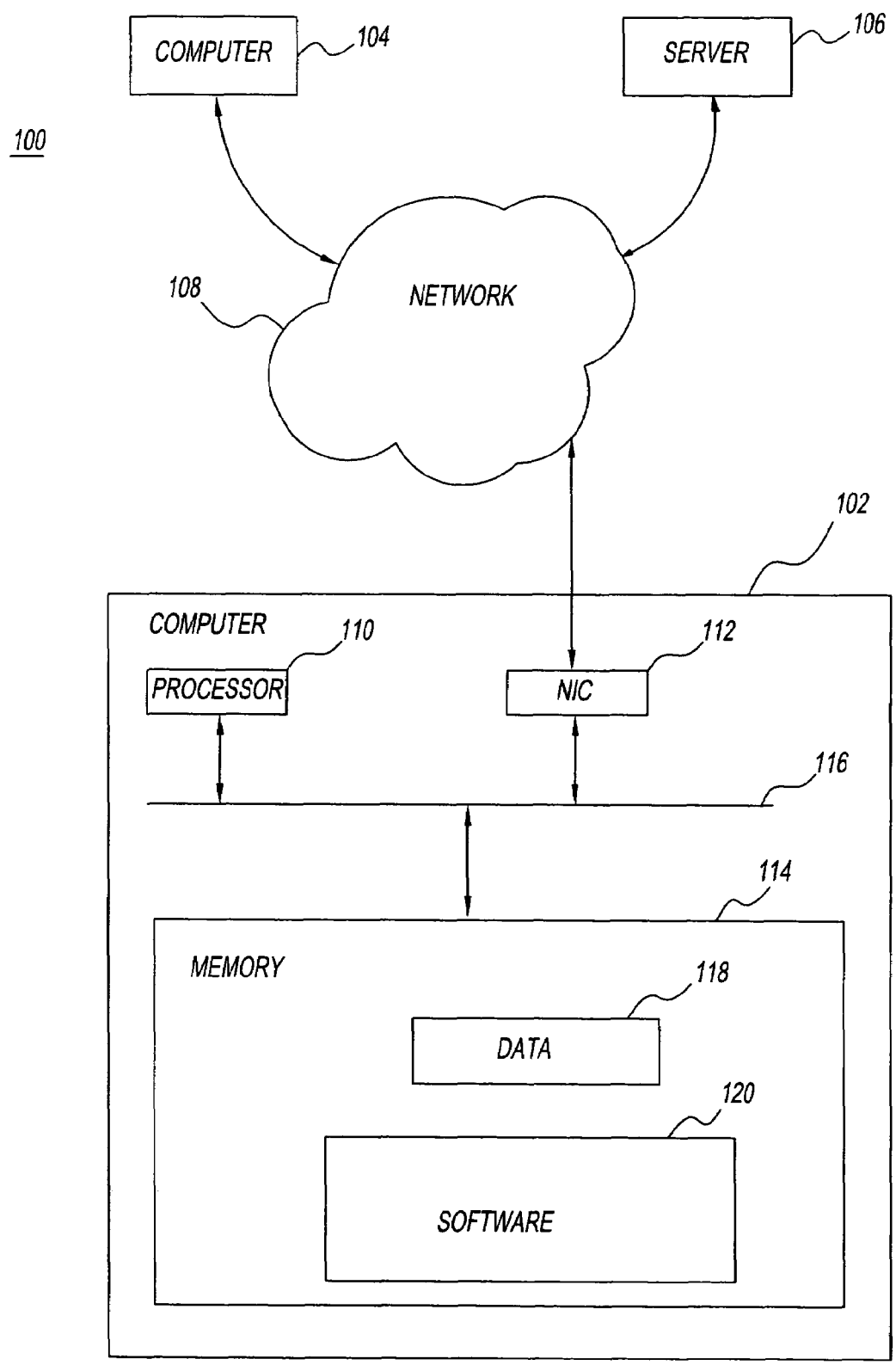
FIG. 1 is a block diagram of a computer embodiment of the present invention.

Referring to FIG. 1, a communication system 100 includes a computer 102, a computer 104, a server 106 and a network 108. Computers 102 and 104 and server 106 are interconnected via network 108. Computers 102 and 104 and server 108 communicate with one another via network 108. It will be apparent to those skilled in the art that two computers and one server are shown by way of example and many more computers, servers as well as other communication devices can be connected to network 108.

Network 108 may be any one, or multiples, of a wired or a wireless communication network, or it could be a combination of wired and wireless networks. Typically, the computers and servers in FIG. 1 are connected through the Internet.

Computers 102 and 104 may be any suitable computer such as a large computer or a small computer, such as a personal computer, a notebook computer, a desktop computer, any work station, a mobile device (e.g., a personal digital assistant, a cell phone, a pager and the like), any device with computing capability (e.g., a sensor, an actuator, a vending machine, a control system and the like) or any combination thereof. The term "computer", as used herein, means any of the foregoing. Computers 102 and 104 may have wired or wireless links to network 108.

Computer 102 is a preferred embodiment of the present invention that contains software for on-demand network access control. Computer 102 includes a processor 110, a network interface card (NIC) 112 and a memory 114 that are interconnected via a bus 116. Memory 114 includes data 118 and software 120. NIC 112 is connected to network 108.

Figure 2:
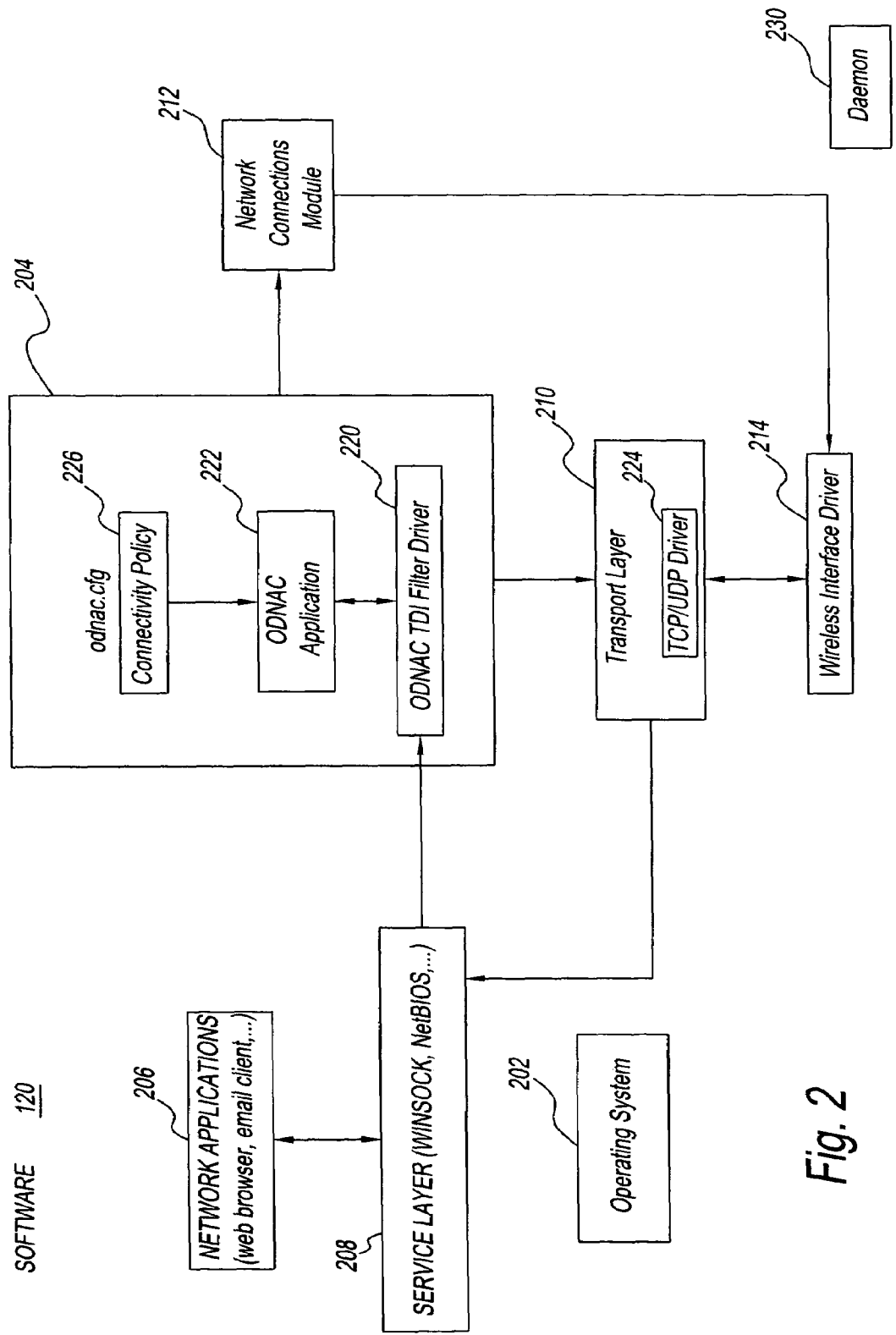
FIG. 2 is a block diagram of the software of the computer of FIG. 1.

Referring to FIG. 2, software 120 includes an operating system 202, an on-demand network access control (ODNAC) module 204, network applications 206, a service layer 208, a transport layer 210, a network connections management module (NCM) 212 and a wireless interface driver 214. Wireless interface driver 214 is the software interface to NIC 112. Network applications 206 include, for example, web browsers, instant messaging applications, email clients, and so on, that cause requests to be sent to the service layer 208 and to the transport layer 210. Examples of such network requests include requesting to send data to a remote server, requesting to connect to a remote server and querying for information about a remote server. These types of requests are denoted outbound requests. Network requests can also be inbound. Examples of inbound requests include requests from remote clients to connect to a server on the local machine as well as reception of data from remote servers and clients. ODNAC module 204 detects these network requests, associates the requests with the application, or process, that initiated the outbound request, or which is the destination of the inbound request, and controls wireless interface driver 214 to enable and disable NIC 112.

ODNAC module 204 includes a connectivity policy 226 that determines which applications are allowed to affect the state of NIC 112 and what their corresponding timeout periods are (control specifications). ODNAC module 204 controls NIC 112 based on connectivity policy 226 to enable and disable the access computer 102 to network 108 to minimize the window-of-opportunity for a network attack and to optimize power savings. Connectivity policy 226 can be set by a user, software 120 or an information technology (IT) organization that will lock the user's preference based on IT policy. ODNAC module 204 uses connectivity policy 226 to control the throttling of NIC 112. This control is sometimes referred to herein as "on-demand network access control" (ODNAC).

In this description, a number of software terms that are used herein are defined as follows:

The term "process" is an executable software program which performs a function on behalf of either the user or the operating system (OS) or both. Examples of user processes are a web browser, an email client and an instant messenger application. These particular types of processes are also more commonly known as user application programs, or applications for short. A process can also be launched by operating system 202 to perform a service on behalf of operating system 202. Two examples of this type of process include a service which interacts with network servers to update operating system 202 and a service which ensures the internet protocol (IP) network address is valid and renewed in a timely fashion. These types of services are typically not visible to the user as they have no "window" or icon on the desktop. Processes are managed by operating system 202, which ensures that each process is given a time slice during which it can execute.

The term "task" is an executable software routine that performs a function within a process, within operating system 202 or within a driver. A task can be any function within an application or process or within operating system 202 or a driver. A task may also be a process.

The term "driver" is a software module that executes as part of operating system 202 in the sense that it typically executes in the same address space as operating system 202 and can call kernel functions. The most well known drivers are hardware device drivers which enables operating system 202 and applications to communicate with and use hardware devices such as a keyboard, mouse, hard disk drive, network interface card, speaker, display, etc. Drivers can also interface to other drivers and create what is known as a driver stack. Examples of driver stacks include the network driver stack and the file system driver stack. Drivers communicate with other drivers typically by sending so-called request packets via operating system 202. A request packet typically contains at least one data structure. A sending driver typically calls upon operating system 202 to send a request packet to an entry point in another driver. Operating system 202 may also validate the content of the request data structure(s).

A "filter" driver is a driver that inserts itself in front of, or behind, a target driver for the sake of intercepting the request packets flowing in and out of the target driver.

The term network "mode" refers to the network status of the computer. The network mode is said to be "operational" if the computer has a valid network address, such as an Internet protocol (IP) address. This means that the computer is logically connected to the network and can detect incoming network traffic. The network mode is said to be "disconnected" if the computer does not have a valid network address. This means that the computer is logically disconnected from the network and can not detect incoming traffic.

The term network "port" refers to the transmission control protocol (TCP) port number. The port number represents the end point of a logical connection with another network connected computer. There are two end points, and thus two port numbers, in a connection. Together, the two port numbers and the Internet protocol (IP) network address of each end point, uniquely identify a connection between a network process, or task, running on one computer and a network process, or task, on another computer. Typically, port numbers fall within the range of 0 and 65535.

The term "network request", or just "request", is defined as any data, control or query information, or any data, control or query requests, that have any relation to networking and which is being processed by components in the networking software stack, or which is being exchanged between the transport layer and the client, application or service layer, or which is being exchanged between other software components. A request can be inbound or outbound, but is not limited thereto.

Still referring to FIG. 2, software 120 depicts, by way of example, a functional implementation under a Windows XP™ operating system, available from Microsoft Corporation. ODNAC module 204 further includes an ODNAC filter driver 220 and an ODNAC application 222. ODNAC filter driver 220 is a TDI (Transport Driver Interface) filter driver that detects all outbound requests to the TCP (Transport Control protocol) and UDP (Unreliable Delivery protocol) transport layer. ODNAC filter driver 220 also detects all inbound requests from the transport layer 210. Transport layer 210 includes a TCP/UDP protocol driver 224. In the context of ODNAC filter driver 220, transport layer protocol driver 224 is referred to herein as the target driver. It will be apparent to those skilled in the art that transport layer 210 may employ separate drivers for the TCP and UDP protocols as well as other drivers for other protocols. ODNAC application 222 includes most of the ODNAC state machine and which is described further in FIGS. 3-5. ODNAC application 222 interacts with NCM module 212, which controls the state of wireless interface driver 214. For example, module 212 is able to turn wireless NIC 112 on and off.

Periodically, e.g., every second, ODNAC manager 222 queries NCM module 212 for the status of wireless NIC 112, wireless NIC driver 214 and of the network mode. Every time the status of either wireless interface driver 214 or the network mode changes, ODNAC application 222 makes a note of this and informs ODNAC filter driver 220. In this way, ODNAC filter driver 220 is notified if wireless interface driver 214 is on so that ODNAC filter driver 220 can instantly forward requests to TCP/UDP driver 224 so as to eliminate any unnecessary delays of network traffic. In a more optimal solution, NCM module 212 would be configured to asynchronously alert ODNAC application 222 or ODNAC filter driver 220 of status changes in wireless interface driver 214 and in the network mode.

In operating system 202 there are many processes that are able to initiate network requests. In the preferred embodiment, a primary concern is enabling the application-related processes to control the state of wireless interface driver 214. Therefore, as part of configuring ODNAC module 204, the user indicates the name of those processes that are allowed to control the state of wireless interface driver 214. The indicated process (or application) names are stored in connectivity policy 226. The user designated processes contained in connectivity policy 226 are considered valid processes. When ODNAC module 204 is first launched, it interacts with operating system 202 to resolve the list of process names with their associated process identification (PID) numbers.

Figure 3:
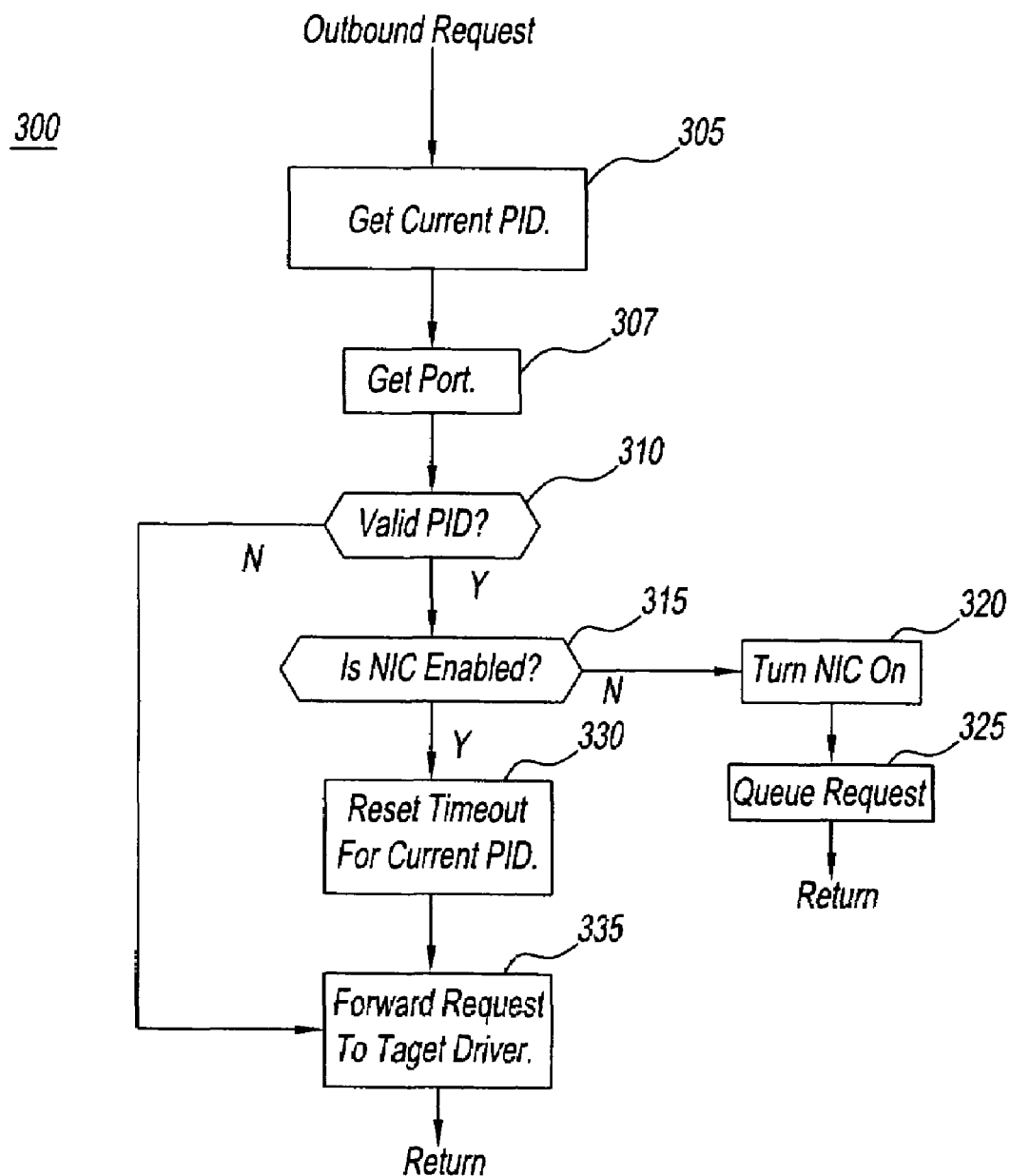
FIG. 3 is a flow diagram of the ODNAC program of FIG. 2 for handling outbound network requests.

Referring to FIG. 3, a flow chart 300 depicts that part of the ODNAC module 204 that handles outbound network requests. Typically, the software structure associated with an outbound request does not inform about the process ID (PID) or the process name that initiated it. However, outbound network requests are typically handled within the context of a process. Thus, when ODNAC module 204 detects an outbound request, it can operate based on the assumption that it is the current process that initiated the request.

Figure 4:
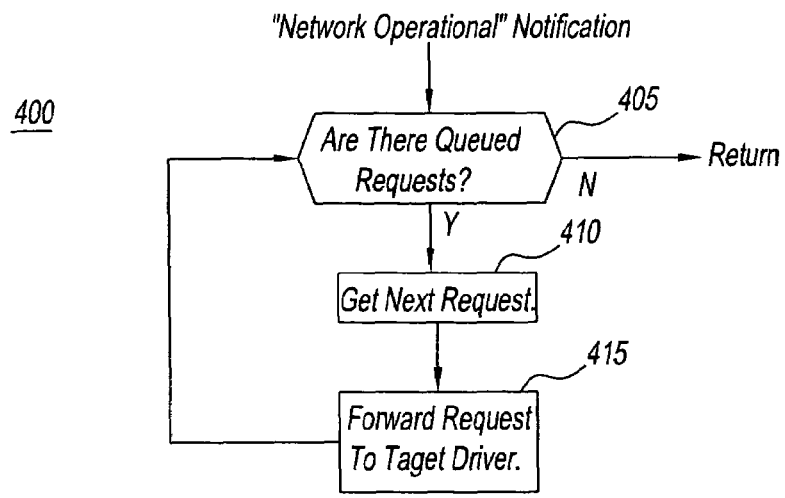
FIG. 4 is a flow diagram of the ODNAC program of FIG. 2 for releasing queued outbound network requests.

At step 305, it is determined which PID the request is associated with as this information is readily available from operating system 202. Next in step 307, the network port the request is using is logged and mapped with the PID in a PID vs port mapping table (not shown). This information will be used when handling inbound requests in FIG. 5. Next in step 310, it is determined if the PID in connectivity policy 226 is valid. If the answer is "No", the request is immediately forwarded to the target driver (TCP/UDP driver 224) in step 335. If the answer is "Yes", it is next determined in step 315 if NIC 112 is already enabled. If the answer is "No", NIC 112 is turned on in step 320 and the request is queued in step 325 for later processing (as depicted in FIG. 4). If the answer is "Yes", the timeout value for the current PID is reset in step 330 and then the request is forwarded to the target driver in step 335.

FIG. 4 shows a flow chart 400 that depicts the part of ODNAC module 204 that handles the release of outbound network requests. As mentioned earlier, ODNAC module 204 is notified whenever the state of the network mode changes. Thus, when the network becomes operational, which happens when operating system 202 determines that it has a valid IP address, ODNAC module 204 receives a "Network operational" notification. ODNAC module 204 then determines if there are any queued network requests in step 405. If the answer is "No", the routine returns. If the answer is "Yes", the ODNAC module 204 retrieves the next request from the queue in step 410, forwards the request to the target driver (TCP/UDP driver 224) in step 415 and loops back to step 405.

Figure 5:
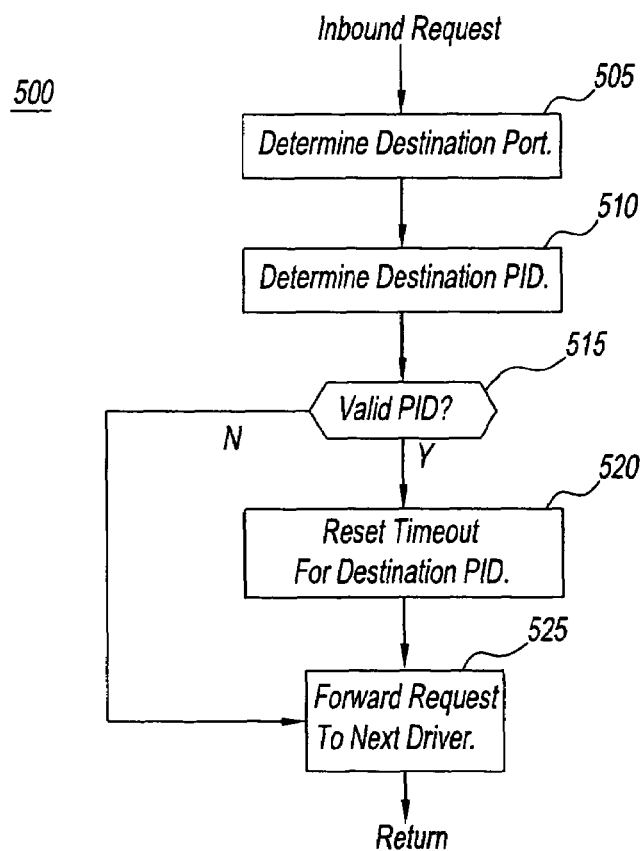
FIG. 5 is a flow diagram of the ODNAC program of FIG. 2 for handling inbound network requests.

FIG. 5 shows a flow chart (500) of that part of ODNAC module 204 that handles inbound network requests. When ODNAC module 204 receives such a request, there may not be an easy way to determine which PID the request is destined for. This is because inbound network requests are asynchronous in nature and occur randomly with respect to when the destination network process is scheduled to execute. However, the destination network port is typically propagating with the inbound request, or can be resolved via operating system 202, so the destination port number is determined in step 505. Next in step 510 the destination PID is extracted from the (PID port) mapping table, which gets populated during handling of outbound requests (FIG. 3). Next in step 515 it is determined if the PID is valid. If the answer is "No", the request is forwarded to the next driver in step 525. If the answer is "Yes", the timeout of the destination PID is reset in step 520 and then the request is forwarded to the next driver in step 525.

There may be tasks that a user does not want to be able to affect the state of NIC 112. One very important example of this is a virus. Typically, when a virus executes, the OS 202 assigns a PID to the virus process. But since the name of the virus, in most cases, will not be listed in the connectivity policy 226, the virus will not be able to affect the state of the NIC 112. Thus, a virus can not prevent NIC 112 from getting disconnected. Also, the virus cannot cause a disconnected NIC 112 to be turned on.

Another example is a DHCP (dynamic host control protocol) client service, which is responsible for obtaining and maintaining the IP network address. The DHCP service may renew the IP address at small intervals, say every five minutes. In principle, this action may prevent NIC 112 from ever getting disconnected. This protocol may attempt to access network 108 even after NIC 112 has been disconnected, which would cause NIC 112 to become re-enabled soon after it is disconnected.

Yet another example of a task that should not affect the state of NIC 112 is with respect to applications that are either scheduled to look for updates on network 108 or that automatically look for updates whenever they are launched. This is becoming quite commonplace for applications, e.g., media players, photo applications, software installers, and for operating system 202. The problem is that, say a media player, is launched to play an mpeg movie. Typically, the user is unaware that this application may also automatically perform a network query for updates and offers. Thus, typically, a user would not want such an application to affect the state of NIC 112 since the user only indirectly caused network 108 to be accessed. However, it is important that these applications be given some opportunity to occasionally access network 108. ODNAC module 204 operates to trap a notification that occurs when network timers associated with these applications expire or when the applications are launched. Then when NIC 112 is enabled for other legitimate reasons, callback functions associated with the expired timers are called. Note that the notion of a callback function is well known to anyone skilled in the art of systems programming. If an application is shut down before NIC 112 is enabled, the associated action to call that application's callback function can also be cancelled.

Since a computer becomes disconnected from the network when NIC 112 is disabled, a client computer and any network entities (e.g., a server) with which a computer application has a session must have the capability to handle the lack of connectivity so that the client computer and server are able to seamlessly reconnect when the client computer reconnects to network 108. ODNAC module 204 assumes that client computers and servers have this capability. If a computer application does not have this capability, or if the computer application for other reasons can not operate in a disconnected mode, the computer application can inform ODNAC module 204 to not disconnect the network interface while the application is running.

When NIC 112 is disconnected, other network components can not respond to or connect to the disconnected computer. To enable other network components to communicate with the computer, a daemon process, or task, 230 (FIG. 2) running on the disconnected computer turns NIC 112 on periodically for brief moments. Daemon 230 queries a suitable server, or intermediary network device, to determine if network components have made attempts to access the computer. In the preferred embodiment, a computer application may request ODNAC module 204 to set a timer which, if granted by ODNAC module 204, triggers daemon 230 to access network 108.

ODNAC module 204 can also throttle services running on servers in a demilitarized zone (DMZ). Typically, a DMZ is a small network of servers inserted as a neutral zone in between a company's private network and the outside public network. It prevents outside users from getting access to computers, such as servers with confidential data, on the private network. Say a client computer station is running an application that requires a service running on a network server located in a DMZ. The security of the computer would then be compromised if the application were allowed to stay connected to the DMZ server because the DMZ server has increased exposure to network attacks and the DMZ server may be able to launch applications on the client computer. Thus, if the DMZ service is allowed to run while the client computer is disconnected from the network, the DMZ server can prepare an attack on the client computer and simply wait until the client computer reconnects to network 108. In this scenario, ODNAC module 204 throttles the session between the client computer and the DMZ server so that the service is disconnected at the same time, or actually just before, the client computer disconnects from the network. Similarly, the DMZ service is re-enabled right after the client computer reconnects to the network.

Although NIC 112 has been shown as a wireless NIC, it will be apparent to those skilled in the art that a wired NIC, such as an Ethernet interface can also be used. Additionally, multiple NICs, which may be either wired or wireless or both, can be used.

It is possible to disconnect the computer from the network in other ways than described above. For example, it may be possible to control the network configuration by erasing the network settings (e.g., the Internet address) and by disabling the DHCP service. To reconnect the computer to the network, the DHCP service is reenabled. The advantage of this is that the wireless interface doesn't have to shut off upon disconnect and it doesn't need to be restarted and synchronize with the access point upon reconnecting to the network, and thus enables for a much faster network reconnect time. This solution does not save power in the NIC.

A similar solution to the previous involves virtualizing the network configuration so that from an external network perspective the computer is invisible and does not respond the external network requests. But internally, the true network configuration is enabled whenever the user needs to access the network, at which point the computer does become visible to the external network. In this fashion, the latency involved in obtaining a new address through DHCP is eliminated.

Yet another way of protecting against network attacks, without actually disconnecting the computer from the network or hiding the network configuration from the external network, is to filter incoming network requests after the IP layer. ICMP packets (used to ping a computer) can then be detected and thrown out so that a network attacker won't know if the computer exists (based on simply ping'ing it.) Secondly, the IP filter could examine the connection state (i.e., port number and IP addresses) of the packet to determine if a local application is currently using the particular connection state. If it is, then the packet is forwarded to the TCP layer. If it is not, then the packet is thrown out. If the packet is indiscriminately forwarded to the TCP layer, it is likely that the TCP layer will respond with an acknowledgement packet to the sender, in which case the sender would know that the computer exists on the network even for an invalid connection state.

The present invention having been thus described with particular reference to the preferred forms thereof, it will be obvious that various changes and modifications may be made therein without departing from the spirit and scope of the present invention as defined in the appended claims.

What is claimed is:

1. A method for controlling access between a computer and a network, said method comprising:
    detecting network requests associated with at least one task running on said computer;
    in response to a detected network request, enabling said task to access said network if network access for said task is currently disabled;
    determining if said task may access said network and if yes performing said enabling step; and
    in response to a lack of recent activity associated with said task on said network, preventing at least one device on said network from accessing at least one port which is currently open on said computer.

2. The method of claim 1, wherein the step of preventing prevents access to all ports of said computer.

3. The method of claim 1, wherein the step of preventing comprises at least one step selected from the group consisting of: closing all ports on said computer, making a network address of said computer invisible from said network, stopping a Dynamic Host Control Protocol (DHCP) service running on said computer, and disabling at least one NIC associated with said computer.

4. The method of claim 1, wherein the step of enabling said task to access said network comprises at least one step selected from the group consisting of: enabling a port on said computer, making a network address of said computer invisible from said network, starting a DHCP service, and enabling a Network Interface Card (NIC) associated with said computer.

5. The method of claim 1, further comprising determining if a timeout period has elapsed during which said network has been free of activity associated with said task, and if said timeout period has elapsed, performing the step of preventing.

6. The method of claim 1, wherein said network requests are inbound or outbound from said other devices or said task, respectively.

7. The method of claim 1, wherein said task is one of a plurality of tasks that run on said computer, and further comprising filtering said requests based on a connectivity policy that allows only requests from selected ones of said tasks to be an input to said enabling step.

8. The method of claim 7, wherein said selected tasks are established by one selected from the group consisting of: a user; automatically; and a combination thereof.

9. The method of claim 7, wherein said preventing step is also performed in response to none of said selected tasks currently running on said computer.

10. The method of claim 1, further comprising enabling access to said network for brief instants without regard to said network requests; and querying at least one server connected to said network to determine if attempts have been made to access said computer.

11. The method of claim 10, wherein said enabling access to said network for brief instants and querying steps are initiated periodically and/or in response to a request from one of said tasks.

12. The method of claim 1, wherein the enabling and preventing steps throttle access of said computer to said network so as to shrink windows of opportunity for said computer to be attacked by other devices connected to said network.

13. The method of claim 12, wherein said access between said computer and said network is throttled during a session of said computer with a network server in a De-Militarized Zone (DMZ) zone so that such access is enabled for a service offered by the network server during said session and is disabled by said preventing step.

14. A computer that is operable to control access between the computer and a network, said computer comprising:
   a processor;
   at least one task that run on said computer; and
   an application that runs on said computer, said application causing said processor to perform the operations of:
      detecting network requests associated with said task running on said computer;
      in response to a detected network request, enabling said task to access said network if network access for said task is currently disabled;
      determining if said task may access said network and if yes performing said enabling operation; and
      in response to a lack of recent activity associated with said task on said network, preventing at least one device on said network from accessing at least one port which is currently open on said computer.

15. The computer of claim 14, wherein the operation of preventing prevents access to all ports of said computer.

16. The computer of claim 14, wherein the operation of preventing comprises at least one operation selected from the group consisting of: closing all ports on said computer, making a network address of said computer invisible from said network, stopping a Dynamic Host Control Protocol (DHCP) service running on said computer, and disabling at least one Network Interface Card (NIC) associated with said computer.

17. The computer of claim 14, wherein the operation of enabling said task to access said network comprises at least one operation selected from the group consisting of: enabling a port on said computer, making a network address of said computer invisible from said network, starting a Dynamic Host Control Protocol (DHCP) service, and enabling a Network Interface Card (NIC) associated with said computer.

18. The computer of claim 14, wherein said application further causes the processor to perform the operation of determining if a timeout period has elapsed during which said network has been free of activity associated with said task, and if said timeout period has elapsed, performing the operation of preventing.

19. The computer of claim 14, wherein said network requests are inbound or outbound from said other devices or said task, respectively.

20. The computer of claim 14, wherein said task is one of a plurality of tasks that run on said computer, and wherein said application further causes the processor to perform the operation of filtering said requests based on a connectivity policy that allows only outbound requests from selected ones of said tasks to be an input to said enabling operation.

21. The computer of claim 20, wherein said selected tasks are established by one selected from the group consisting of: a user; automatically; and a combination thereof.

22. The computer of claim 20, wherein said preventing operation is also performed in response to none of said selected tasks currently running on said computer.

23. The computer of claim 14, wherein said application further causes the processor to perform the operations of enabling access to said network for brief instants without regard to said network requests and querying at least one server connected to said network to determine if attempts have been made to access said computer.

24. The computer of claim 23, wherein said enabling access to said network for brief instants and querying operations are initiated periodically and/or in response to a request from one of said tasks.

25. The computer of claim 14, wherein the enabling and preventing operations throttle access of said computer to said network so as to shrink windows of opportunity for said computer to be attacked by other devices connected to said network.

26. The computer of claim 25, wherein said access between said computer and said network is throttled during a session of said computer with a network server in a De-Militarized Zone (DMZ) zone so that such access is enabled for a service offered by the network server during said session and is disabled by said preventing step.

27. A memory media for controlling a computer to control access between the computer and a network, said computer comprising a processor, said memory media comprising: said memory media storing a program that comprises instructions that control when executed by said computer cause said computer to perform the operations of:
   detecting network requests associated with at least one task running on said computer;
   in response to a detected network request, enabling said task to access said network if network access for said task is currently disabled;
   determining if said task may access said network and if yes performing said enabling operation and
   in response to a lack of recent activity associated with said task on said network, preventing at least one device on said network from accessing at least one port which is currently open on said computer.

28. The memory media of claim 27, wherein the operation of preventing prevents access to all ports of said computer.

29. The memory media of claim 26, wherein the operation of preventing comprises at least one operation selected from the group consisting of: closing all ports on said computer, making a network address of said computer invisible from said network, stopping a Dynamic Host Control Protocol (DHCP) service running on said computer, and disabling at least one Network Interface Card (NIC) associated with said computer.

30. The memory media of claim 28, wherein the operation of enabling said task to access said network comprises at least one operation selected from the group consisting of: enabling a port on said computer, making a network address of said computer invisible from said network, starting a Dynamic Host Control Protocol (DHCP) service, and enabling a Network Interface Card (NIC) associated with said computer.

31. The memory media of claim 28, wherein said application further causes the processor to perform the operation of determining if a timeout period has elapsed during which said network has been free of activity associated with said task, and if said timeout period has elapsed, performing the operation of preventing.

32. The memory media of claim 28, wherein said network requests are inbound or outbound from said other devices or said task, respectively.

33. The memory media of claim 28, wherein said task is one of a plurality of tasks that run on said computer, and wherein said application further causes the processor to perform the operation of filtering said requests based on a connectivity policy that allows only requests from selected ones of said tasks to be an input to said enabling operation.

34. The memory media of claim 33, wherein said selected tasks are established by one selected from the group consisting of: a user; automatically; and a combination thereof.

35. The memory media of claim 33, wherein said preventing operation is also performed in response to none of said selected tasks currently running on said computer.

36. The memory media of claim 27, wherein said application further causes the processor to perform the operations of enabling access to said network for brief instants without regard to said network requests and querying at least one server connected to said network to determine if attempts have been made to access said computer.

37. The memory media of claim 36, wherein said enabling access to said network for brief instants and querying operations are initiated periodically and/or in response to a request from one of said tasks.

38. The memory media of claim 36, wherein the enabling and preventing operations throttle access of said computer to said network so as to shrink windows of opportunity for said computer to be attacked by other devices connected to said network.

39. The memory media of claim 27, wherein said access between said computer and said network is throttled during a session of said computer with a network server in a De-Militarized Zone (DMZ) zone so that such access is enabled for a service offered by the network server during said session and is disabled by said preventing step.

* * * * *